United States Patent [19]
Strasser

[11] Patent Number: 5,172,933
[45] Date of Patent: Dec. 22, 1992

[54] AIR BAG DIVERTER

[75] Inventor: Robert A. Strasser, Livonia, Mich.

[73] Assignee: Ford Motor Company, Dearborn, Mich.

[21] Appl. No.: 419,185

[22] Filed: Oct. 10, 1989

[51] Int. Cl.⁵ .............................................. B60R 21/28
[52] U.S. Cl. ................................... 280/740; 280/732; 280/743
[58] Field of Search ............... 280/740, 741, 742, 743, 280/728, 729, 732

[56] References Cited

U.S. PATENT DOCUMENTS

| | | | |
|---|---|---|---|
| 3,473,824 | 10/1969 | Carey et al. | 280/729 |
| 3,610,657 | 10/1971 | Cole | 280/729 |
| 3,762,501 | 8/1973 | Daniel et al. | 342/114 |
| 3,768,830 | 10/1973 | Hass | 280/729 |
| 3,770,387 | 11/1973 | Loomba | 280/736 |
| 3,784,225 | 1/1974 | Fleck et al. | 280/729 |
| 3,802,719 | 4/1974 | Brown | 280/729 |
| 3,813,112 | 5/1974 | Hermann | 280/736 |
| 4,068,862 | 1/1978 | Ishi et al. | 280/740 |
| 4,153,273 | 5/1989 | Risko | 280/740 |
| 4,262,931 | 4/1981 | Strasser et al. | 280/743 |
| 4,265,468 | 5/1981 | Suszko et al. | 280/729 |
| 4,332,398 | 6/1982 | Smith | 280/740 |
| 4,500,114 | 2/1985 | Grey, Jr. | 280/742 |
| 4,830,401 | 5/1989 | Honda | 280/736 |

Primary Examiner—Kenneth R. Rice
Attorney, Agent, or Firm—Daniel M. Stock; Roger L. May

[57] ABSTRACT

An inflatable occupant restraint device includes an airbag in fluid communication with a gas generator and a diverter carried within the air bag adjacent the gas discharge openings of the gas generator to direct a portion of the gas flow away from the occupant to be restrained.

17 Claims, 3 Drawing Sheets

AIR BAG DIVERTER

BACKGROUND OF THE INVENTION

The present invention relates generally to inflatable restraint systems, and more particularly to air bag assemblies for such systems that employ a diverter to direct a portion of the inflating gas away from a vehicle occupant.

DESCRIPTION OF THE PRIOR ART

One approach to the provision of passive occupant restraint systems in automotive vehicles is the provision of a supplemental inflatable restraint or air bag system in which an air bag is positioned in juxtaposition with a seated occupant of the vehicle who is further restrained by a seat belt. The air bag serves to cushion the belted occupant during forward moving deceleration occurring during a frontal collision of predetermined magnitude. The rearward spacing of the occupant with respect to the rearward opening air bag is established by the seating position in which the occupant is belted. If an occupant fails to use the seat belt, however, it is possible that the occupant's seating position will be forward of that which has been found to be desirable, particularly after the incidence of vehicle impact. This can result in the imposition of relatively high force on the occupant by the air bag during inflation because the gas generating device which inflates the air bag is normally positioned such that it discharges a large portion of the gas generated for inflation in the direction of the occupant. The present invention is directed at ameliorating this effect.

It is known in the prior art to provide inflatable restraint systems which employ supplementary compartments within an air bag and baffles which serve to provide localized cushioning and direct the inflating gases laterally outwardly to assure outward inflation of an air bag to accommodate cushioning of more than one passenger. U.S. Pat. No. 4,265,468 to Suszko et. al. is illustrative of such a system. It suffers from many disadvantages, however, since it utilizes a baffle for an entirely different purpose from the diverter of the present invention. It utilizes a baffle of impermeable material to serve as a conduit for directing inflating gas laterally outwardly to ensure the cushioning of a pair of occupants because it must direct substantially all of the inflating gas flow. It further suffers from the disadvantage of being necessarily of substantial dimension to accommodate this flow-controlling function. It is positioned in surrounding relationship with respect to a gas generating device diffuser, as well as a knee cushion below the instrument panel of a vehicle. This necessitates the provision of the large fluid impervious sleeve as a baffle to direct flow outward to a torso bag. In a more conventional positioning of the inflatable restraint system gas generating device in a portion of the instrument panel facing the occupant, however, the use of such a baffle in necessitating lateral outward flow of substantially all of the gas generated for inflation may restrict the inflation of the portion of the air bag directly confronting the properly positioned belted occupant to an extent that may make its use undesirable.

SUMMARY OF THE INVENTION

Responsive to deficiencies of the prior art, it is an object of the present invention to provide an inflatable occupant restraint device of the type positioned in juxtaposition with a seated vehicle occupant which will include a flexible bag in communication with a gas generating device and a diverter carried within the flexible bag operative to deflect a portion of the gas flow from the gas generating device away from the occupant.

According to a feature of the present invention, both the flexible bag and the diverter are formed of fluid permeable fabric to permit a certain amount of gas flow from the gas generating device directly toward the occupant.

According to another feature of the invention, the diverter may be provided with a plurality of apertures extending vertically through the diverter to facilitate the vertical flow of gas from the gas generating device.

BRIEF DESCRIPTION OF THE DRAWINGS

These and other objects and features of the present invention will be apparent to those skilled in the inflatable occupant restraints art upon reading the following description with reference to the accompanying drawing in which.

DESCRIPTION OF THE PREFERRED EMBODIMENTS

Figure 1:
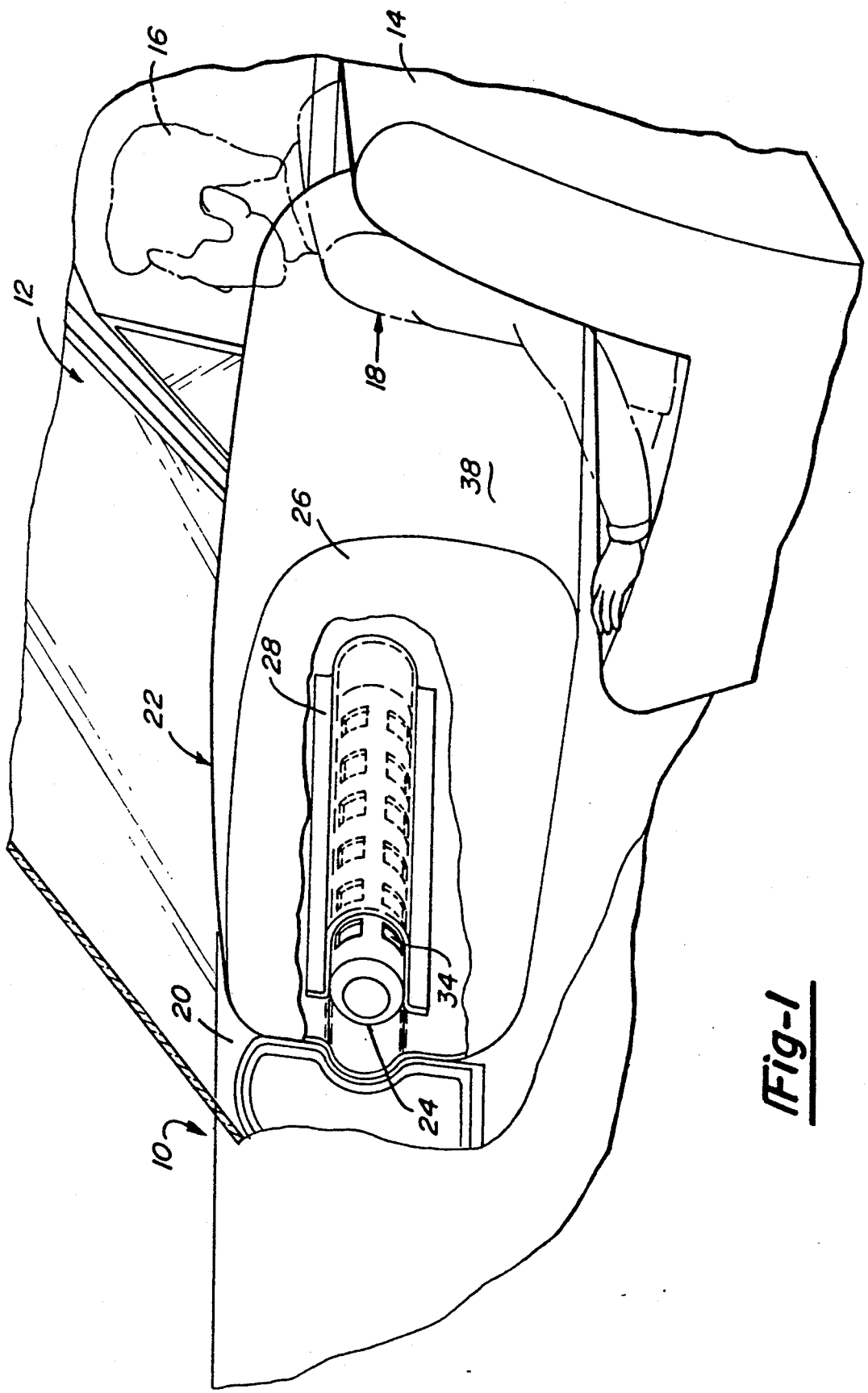
FIG. 1 is a rear perspective view of the passenger compartment of an automotive vehicle in which the inflatable occupant restraint device of the present invention is deployed, certain parts broken away for clarity.

Turning now to the drawings and in particular to FIG. 1, an automotive vehicle 10 is indicated as including a passenger compartment indicated generally at 12. A seat 14 is provided for supporting an occupant 16 in a seated position, as shown. The seat 14 is arranged so that the chest area 18 of the occupant 16 is arranged in juxtaposition with an instrument panel 20 in which is mounted an inflatable occupant restraint device indicated generally at 22. As is well known, such an inflatable occupant restraint device is normally packaged within the confines of the instrument panel 20 and is deployed to the position shown in FIG. 1 only upon the occurrence of a collision of predetermined magnitude and duration. The components and related vehicle systems associated with such packaging and deployment are not essential to the understanding and practice of the present invention and, therefore, will not be described. It is only essential that the inflatable occupant restraint device 22 include a gas generating device 24, an inflatable air bag 26 surrounding and in fluid communication with the gas generating device 24 and a diverter 28.

The gas generating device 24 is illustrated as being of an elongated tubular type having a tubular core member 30 surrounded by a tubular diffuser 32, having a plurality of gas discharge apertures 34 formed through it. Other designs of gas generating devices may be used, however, but it is contemplated that they would be generally arranged such that gas discharge passages 34 face rearwardly toward the occupant 16 from the instrument panel 20. The gas generating device may be structurally secured to the vehicle 10 within the instrument panel 20 by suitable conventional means, not shown.

The air bag 26 is formed of a flexible fluid permeable fabric material, such as nylon, and is secured to the gas generating device 24 so that the gas discharge apertures 34 are in fluid communication with the interior 36 of the air bag 26. In normal operation of an inflatable occupant restraint device of the type shown, a signal indicative of the occurrence of a collision of predetermined magnitude and duration would initiate a chemical reaction generating gas to be discharged through the gas discharge apertures 34 directly outwardly toward the occupant 16 so that the rear surface 38 of the air bag 26 cushioningly engages the chest area 18 of the occupant 16.

Positioned within the interior 36 of the air bag 26 is the diverter 28 which is preferably formed of the same fluid permeable material as the air bag 26 and may be secured thereto by sewing, as indicated at 40. In the expanded state shown in the drawing figures, the diverter 28 forms a generally U-shaped sleeve in close surrounding relationship with respect to the gas generating device 24. With a cylindrical gas generating device of the type illustrated, the inner surface 42 of the diverter 28 is spaced from the discharge apertures 34 a distance equal to approximately twice the diameter of the gas generating device 24. Similar proportioning can be used in positioning the diverter with respect to discharge ports of gas generating devices of other shapes, such as rectangular to effect the desired close surrounding relationship.

Figure 2:
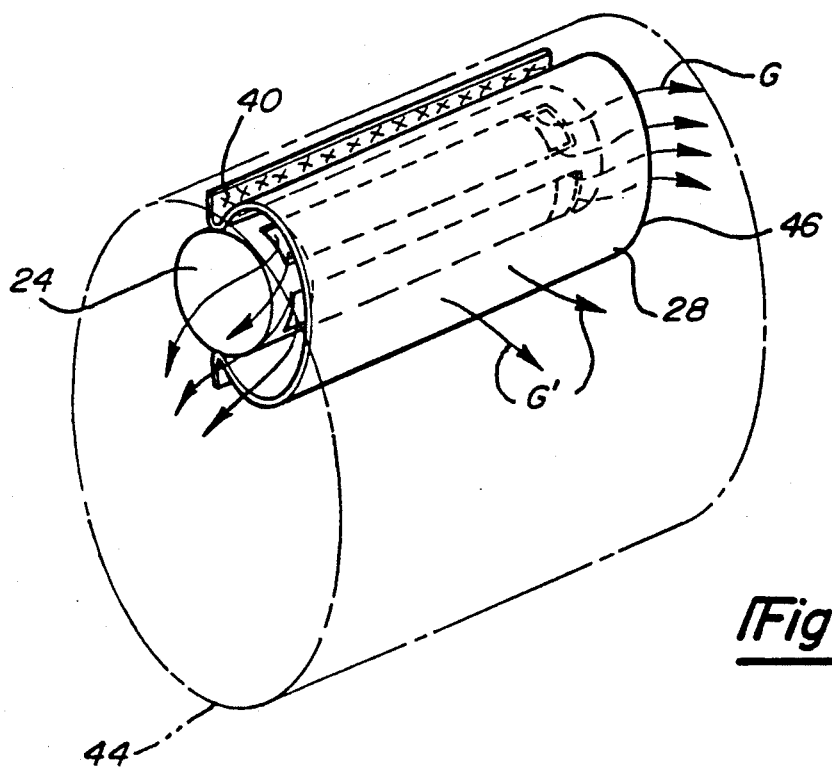
FIG. 2 is a perspective view of the flexible bag and diverter installed about a gas generating device according to the present invention.
Figure 3:
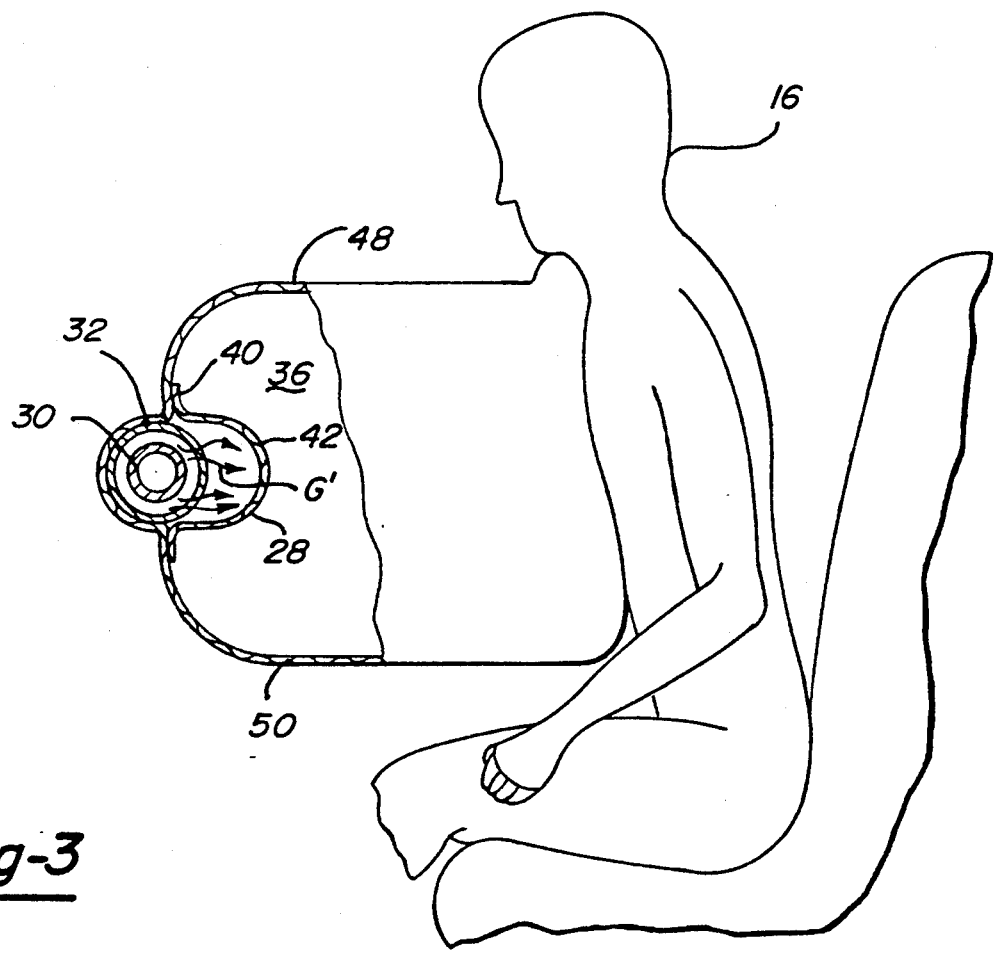
FIG. 3 is a side view partially cross-sectioned illustrating the inflated state of the inflatable occupant restraint device of the present invention.

As may best be seen in FIGS. 1 and 2, the diverter 28 extends laterally across substantially the entire length of the gas generating device 24 to completely lie over all of the gas discharge apertures 34. This construction results in the gas flow pattern, as illustrated by the arrows G in FIG. 2 in which a substantial quantity of gas emanating from the gas generating device 24 is diverted around the lateral ends 44 of the diverter 28, while a lesser portion, indicated by the arrows G' passes through the permeable diverter 28 directly toward the occupant 16. This construction provides cushioning gas flow between the gas discharge apertures 34 and the occupant 16 at a lower rate than that which passes laterally outwardly with respect to the occupant 16.

Figure 4:
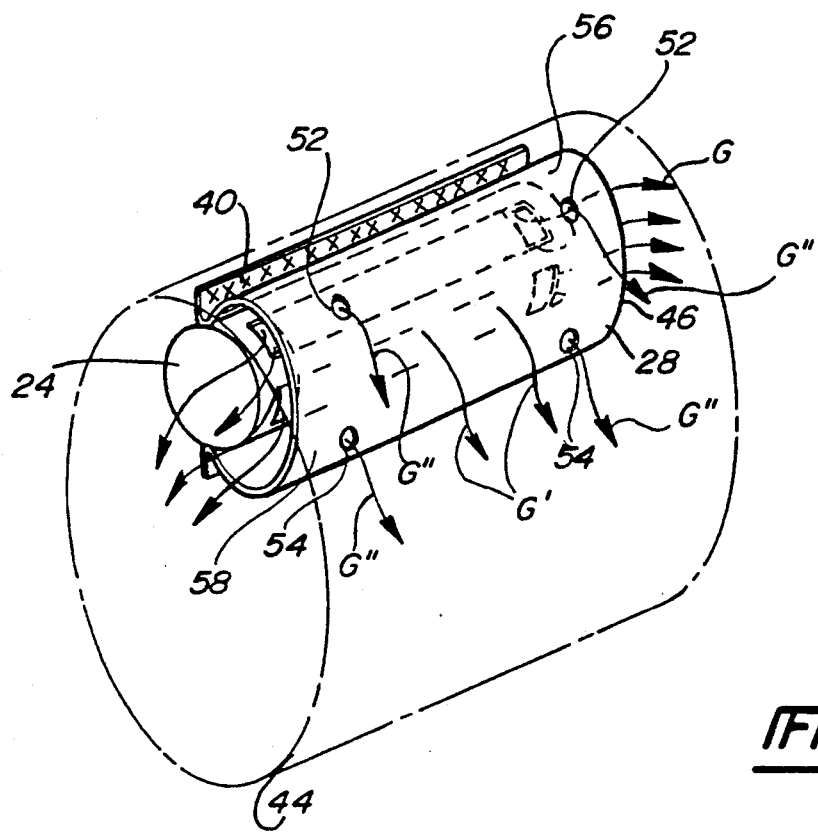
FIG. 4 is a view similar to FIG. 2 illustrating an alternative embodiment of the diverter.
Figure 5:
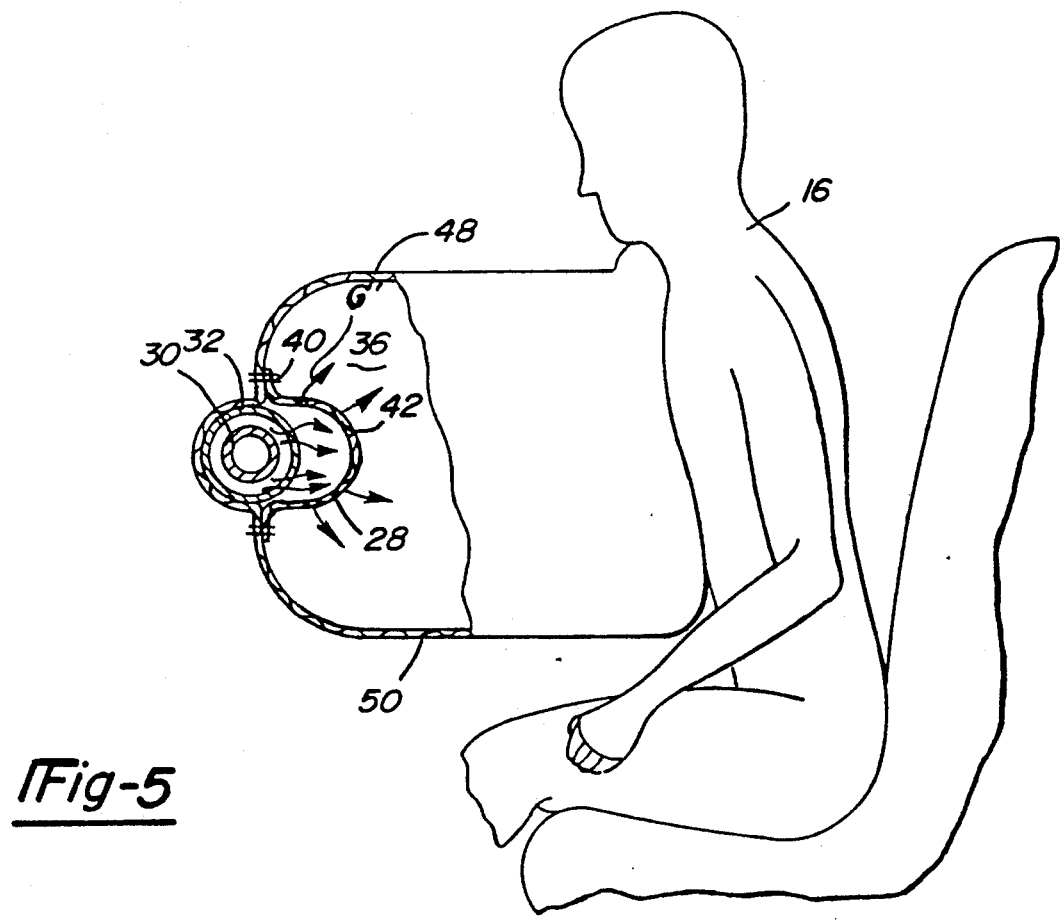
FIG. 5 is a view similar to FIG. 3 showing the inflated state of the invention inflatable occupant restraint device in which the alternative embodiment diverter of FIG. 4 is utilized.

The rate at which upper and lower surfaces 48, 50, respectively, of the air bag 26 are moved to their inflated positions may be enhanced by the modification to the diverter 28 illustrated in FIGS. 4 and 5. It is there illustrated that a modified diffuser 128 may be provided in which a plurality of through apertures 52, 54 are formed through upper and lower surfaces 56, 58, respectively, to define a third path for gas flow designated G" upwardly and downwardly within the air bag 26. In this alternative embodiment, the reduced gas flow in the direction of the occupant 16 is maintained, together with the primary gas flow G around the sides 146 of the diverter 128, but in addition to the regular filling of the air bag 26 filling in upper and lower directions not directed toward the occupant 16 is enhanced. It will be clear to those skilled in the fluid control arts that the size and positioning of the apertures 52, 54 may also be chosen to permit gas flow from the gas generating device 24 toward the occupants at an appropriate rate supplementing or replacing the path of the flow G' provided by the permeability of the fabric from which the diverter 128 is constructed.

While only certain embodiments of the inflatable occupant restraint device have been disclosed, others will be possible without departing from the scope of the appended claims.

I claim:

1. An inflatable occupant restraint device for an automotive vehicle for restraining the movement of an occupant of the vehicle with respect to the device comprising:
    a gas generating device mounted on the vehicle including means for effecting the flow of gas and having gas discharge openings arranged to direct said gas flow toward said occupant;
    a flexible bag fixedly secured to said gas generating device and having interior surfaces in fluid communication with said gas discharge openings for effecting inflation of said flexible bag; and
    a fluid permeable diverter carried within said flexible bag adjacent said gas discharge openings and operative to deflect a portion of said gas flow away from said occupant.

2. An inflatable occupant restraint device as defined in claim 1, wherein said diverter is a flexible member fixedly secured to said flexible bag.

3. An inflatable occupant restraint device as defined in claim 2, wherein said flexible bag and said diverter are each fabricated from a fluid permeable fabric.

4. An inflatable occupant restraint device as defined in claim 3, wherein said diverter is sewn to said flexible bag.

5. An inflatable occupant restraint device as defined in claim 1, wherein said diverter includes means for deflecting said gas flow laterally outwardly with respect to said occupant.

6. An inflatable occupant restraint device as defined in claim 5, wherein said diverter further includes means for deflecting said gas flow vertically with respect to said occupant.

7. An inflatable occupant restraint device as defined in claim 2, wherein said diverter is a U-shaped sleeve.

8. An inflatable occupant restraint device for an automotive vehicle for restraining the movement of an occupant of the vehicle with respect to the device comprising:
    a gas generating device mounted on the vehicle in juxtaposition with said occupant, including means for effecting the flow of gas and having gas discharge openings arranged to direct said gas flow toward said occupant;
    a flexible bag fixedly secured to said gas generating device and having interior surfaces in fluid communication with said discharge openings for effecting inflation of said flexible bag; and
    a diverter carried within said flexible bag in juxtaposition with said occupant adjacent said gas discharge openings and including fluid permeable means operative to deflect a portion of said gas flow away from said occupant and to direct a smaller portion of said gas flow toward said occupant.

9. An inflatable occupant restraint device as defined in claim 8, wherein said diverter is a flexible member fixedly secured to said flexible bag.

10. An inflatable occupant restraint device as defined in claim 9, wherein said flexible bag and said diverter are each fabricated from a fluid permeable fabric.

11. An inflatable occupant restraint device as defined in claim 10, wherein said diverter is sewn to said flexible bag.

12. An inflatable occupant restraint device as defined in claim 8, wherein said diverter includes means for deflecting said gas flow laterally outwardly with respect to said occupant.

13. An inflatable occupant restraint device as defined in claim 12, wherein said diverter further includes means for deflecting said gas flow vertically with respect to said occupant.

14. An inflatable occupant restraint device as defined in claim 9, wherein said diverter is a U-shaped sleeve.

15. An inflatable occupant restraint device as defined in claim 10, wherein said diverter is a U-shaped sleeve of fluid permeable fabric.

16. An inflatable occupant restraint device for an automotive vehicle for restraining the movement of an occupant of the vehicle with respect to the device comprising:
- a gas generating device mounted on the vehicle in juxtaposition with said occupant, including means for effecting the flow of gas and having gas discharge openings arranged to direct said gas flow toward said occupant;
- a flexible bag fixedly secured to said gas generating device and having interior surfaces in fluid communication with said discharge openings for effecting inflation of said flexible gag; and
- a fluid permeable diverter carried within said flexible bag in juxtaposition with said occupant adjacent said gas discharge openings and including means operative to deflect a portion of said gas flow away from said occupant and to direct a smaller portion of said gas flow toward said occupant.

17. An inflatable occupant restraint device for an automotive vehicle for restraining the forward movement of an occupant of the vehicle comprising:
- an elongated gas generating device mounted on the vehicle for lateral extension across the vehicle in juxtaposition with said occupant, including means for effecting the flow of gas and having laterally spaced gas discharge openings arranged to direct said gas flow toward said occupant;
- a flexible bag fixedly secured to said gas generating device and having interior surfaces in fluid communication with said discharge openings for effecting inflation of said flexible gag; and
- a fluid permeable diverter carried within said flexible bag in juxtaposition with said occupant adjacent and overlying all of said gas discharge openings and including means operative to deflect a portion of said gas flow away from said occupant and to direct a smaller portion of said gas flow toward said occupant.

* * * * *